United States Patent
Wilson et al.

(10) Patent No.: US 10,926,581 B2
(45) Date of Patent: Feb. 23, 2021

(54) STATIC DISCHARGE ELEMENT FOR NON-PNEUMATIC TIRE

(71) Applicants: COMPAGNIE GENERALE DES ETABLISSEMENTS MICHELIN, Clermont-Ferrand (FR); Brian Douglas Wilson, Greer, SC (US); Ryan Gaylo, Simpsonville, SC (US); Clayton Bohn, Jr., Mauldin, SC (US); Paul Winston, Greer, SC (US)

(72) Inventors: Brian Douglas Wilson, Greer, SC (US); Ryan Gaylo, Simpsonville, SC (US); Clayton Bohn, Jr., Mauldin, SC (US); Paul Winston, Greer, SC (US)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 249 days.

(21) Appl. No.: 15/777,710

(22) PCT Filed: Nov. 18, 2016

(86) PCT No.: PCT/US2016/062861
§ 371 (c)(1),
(2) Date: May 21, 2018

(87) PCT Pub. No.: WO2017/087853
PCT Pub. Date: May 26, 2017

(65) Prior Publication Data
US 2018/0333984 A1    Nov. 22, 2018

Related U.S. Application Data

(63) Continuation of application No. PCT/US2015/061901, filed on Nov. 20, 2015.

(51) Int. Cl.
*B60B 9/16* (2006.01)
*B60C 19/08* (2006.01)
(Continued)

(52) U.S. Cl.
CPC .................. *B60B 9/16* (2013.01); *B60B 9/04* (2013.01); *B60C 7/18* (2013.01); *B60C 19/08* (2013.01); *B60C 2007/146* (2013.01)

(58) Field of Classification Search
CPC ..... B60C 7/18; B60C 19/08; B60C 2007/146; B60C 9/2009; B60C 9/1821;
(Continued)

(56) References Cited

U.S. PATENT DOCUMENTS

| 2,324,589 A * | 7/1943 | Lytle | B60B 9/16 |
| | | | 301/64.6 |
| 6,453,960 B1 * | 9/2002 | Kondo | C08J 5/24 |
| | | | 152/451 |

(Continued)

FOREIGN PATENT DOCUMENTS

| JP | 4252492 B2 | 1/2009 |
| JP | 2011162167 | 8/2011 |

(Continued)

OTHER PUBLICATIONS

European Patent Office; International Search Report and Written Opinion for patent application PCT/US2015/061901; dated Jul. 29, 2016; Publisher: European Patent Office, Rijswijk, Netherlands, pp. 1-11, (copy enclosed).

(Continued)

*Primary Examiner* — Justin R Fischer
*Assistant Examiner* — Cedrick S Williams
(74) *Attorney, Agent, or Firm* — Neal P. Pierotti (57) ABSTRACT

A non-pneumatic tire is provided that has a hub with a central axis. A supporting structure is located outward from
(Continued)

the hub in a radial direction, and a shear band is located outward from the supporting structure in the radial direction. Tread is located outward from the shear band in the radial direction. A static discharge element extends from a first radial end of the supporting structure to a second radial end of the supporting structure. The first radial end is located closer to the central axis than the second radial end in the radial direction. The static discharge element is electrically conductive to conduct electricity through the supporting structure.

12 Claims, 6 Drawing Sheets

(51) Int. Cl.
*B60C 7/18* (2006.01)
*B60B 9/04* (2006.01)
*B60C 7/14* (2006.01)

(58) Field of Classification Search
CPC ............... B60C 9/2204; B60C 9/0064; B60C 2009/2214; B60C 9/18
See application file for complete search history.

(56) References Cited

U.S. PATENT DOCUMENTS

| | | |
|---|---|---|
| 7,406,989 B1 | 8/2008 | Casaus |
| 2008/0006356 A1* | 1/2008 | Takahashi ............. B29D 30/60 152/209.1 |
| 2013/0048174 A1* | 2/2013 | Cron ........................ B60C 7/10 152/324 |

FOREIGN PATENT DOCUMENTS

| | | | |
|---|---|---|---|
| JP | 2011162167 A | | 8/2011 |
| JP | 2014125082 A | * | 7/2014 |
| JP | 2017001602 A | * | 1/2017 |

OTHER PUBLICATIONS

European Patent Office; International Search Report and Written Opinion for patent application PCT/US2016/062861; dated Mar. 3, 2017; Publisher: European Patent Office, Rijswijk, Netherlands, pp. 1-9, (copy enclosed).
European Patent Office, Communication pursuant to Article 94(3) for 16808869.8-1012; dated Feb. 27, 2019; Publisher European Patent Office, Munich, Germany, pp. 1-4 (copy enclosed).

* cited by examiner

STATIC DISCHARGE ELEMENT FOR NON-PNEUMATIC TIRE

CROSS-REFERENCE TO RELATED APPLICATION

The present application is a national stage entry of International Application Number PCT/US2016/062861 having an international filing date of Nov. 18, 2016 and which claims priority to International Application Number PCT/US2015/061901 which has an international filing date of Nov. 20, 2015. International Application Numbers PCT/US2016/062861 and PCT/US2015/061901 are incorporated by reference herein in their entireties for all purposes.

FIELD OF THE INVENTION

The present invention relates generally to a non-pneumatic tire that has a static discharge element for reducing or eliminating static charges. More particularly, the present application involves a static discharge element that extends through a spoke of a non-pneumatic tire that is electrically conductive to allow a charge to pass from a hub to tread of the non-pneumatic tire.

BACKGROUND

Non-pneumatic tires for vehicles and other applications are known that may include an inner hub, sometimes referred to as a wheel, surrounded circumferentially by an outward radially disposed tread that includes an annular shear band. The inner hub may be made of metal and has a high degree of conductivity. The non-pneumatic tire may include a series of spokes that are disposed radially between the inner hub and the tread. The spokes can be made of polyurethane and cycle between tension and compression upon every revolution of the tire. A shear band may also be included within the non-pneumatic tire and is located radially outward from the spokes.

As this type of non-pneumatic tire rotates under load, the spokes experience bending, extension and compression deformation when they are located downward near the contact patch of the tire. The spokes straighten outside the contact patch relieving the bending and compression deformation. The spokes thus experience cyclic deformation as the tire rotates. These repeated deformation cycles cause fatigue in the spokes and limits the life of the spoke and the non-pneumatic tire.

Vehicles accumulate static electrical charge when driven. If there is sufficient electrical conductivity between the vehicle and ground through the tires then the charge will be continually depleted. However, if the electrical resistance between the ground and vehicle through the tires is too great the vehicle will retain an electrical charge for a significant amount of time once the vehicle has stopped moving. A person may be shocked when touching the vehicle such as when he or she grasps the door handle to open or close the door. It is known to incorporate a material called carbon black into the rubber of tires in order to provide electrical conductivity to the tire to prevent or reduce shock. However, the addition of carbon black to the sidewalls of tires may increases hysteresis and in turn may increase rolling resistance and heat generation. Non-pneumatic tires may include spokes that are made of polyurethane which has less electrical conductivity than the material making up pneumatic tires, and non-pneumatic tires have higher static charge retention than pneumatic tires.

One previous design to provide an electrical path through a pneumatic tire is found in U.S. Pat. No. 7,284,582 B2. An electrically conductive cord is placed between the tire bead region and the tire tread region and extends from one bead of the tire to the other bead of the tire. The cord is located between the cord reinforced rubber carcass ply and the outer visible rubber layer of the sidewall of the pneumatic tire. The cord is composed of a stainless steel wire that is helically wound around a core of polyester fiber. The stainless steel wire itself is inextensible, but the helical configuration allows it to be dynamically extended and flexed. Although capable of creating an electrical path through a sidewall of a pneumatic tire, such cord is not found in non-pneumatic tires that lack the sidewall and bead arrangements configured into the pneumatic tire design. As such, there remains room for variation and improvement within the art.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended FIGS. in which.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention provides for a non-pneumatic tire 10 that has a static discharge element 30 for use in conducting electricity through the tire 10 to prevent or reduce the chances of shocking a person touching the vehicle and to remove unwanted static electricity from the vehicle. The static discharge element 30 is located at the supporting structure 22 of the non-pneumatic tire 10 in order to transfer the electricity across the supporting structure 22 which may be otherwise composed of materials that have poor electrical conductive properties. The static discharge element 30 is electrically conductive and may be made in a variety of manners. In some embodiments, the static discharge element 30 is elastic so that it may function with supporting structures 22 that are likewise elastic.

Figure 1:
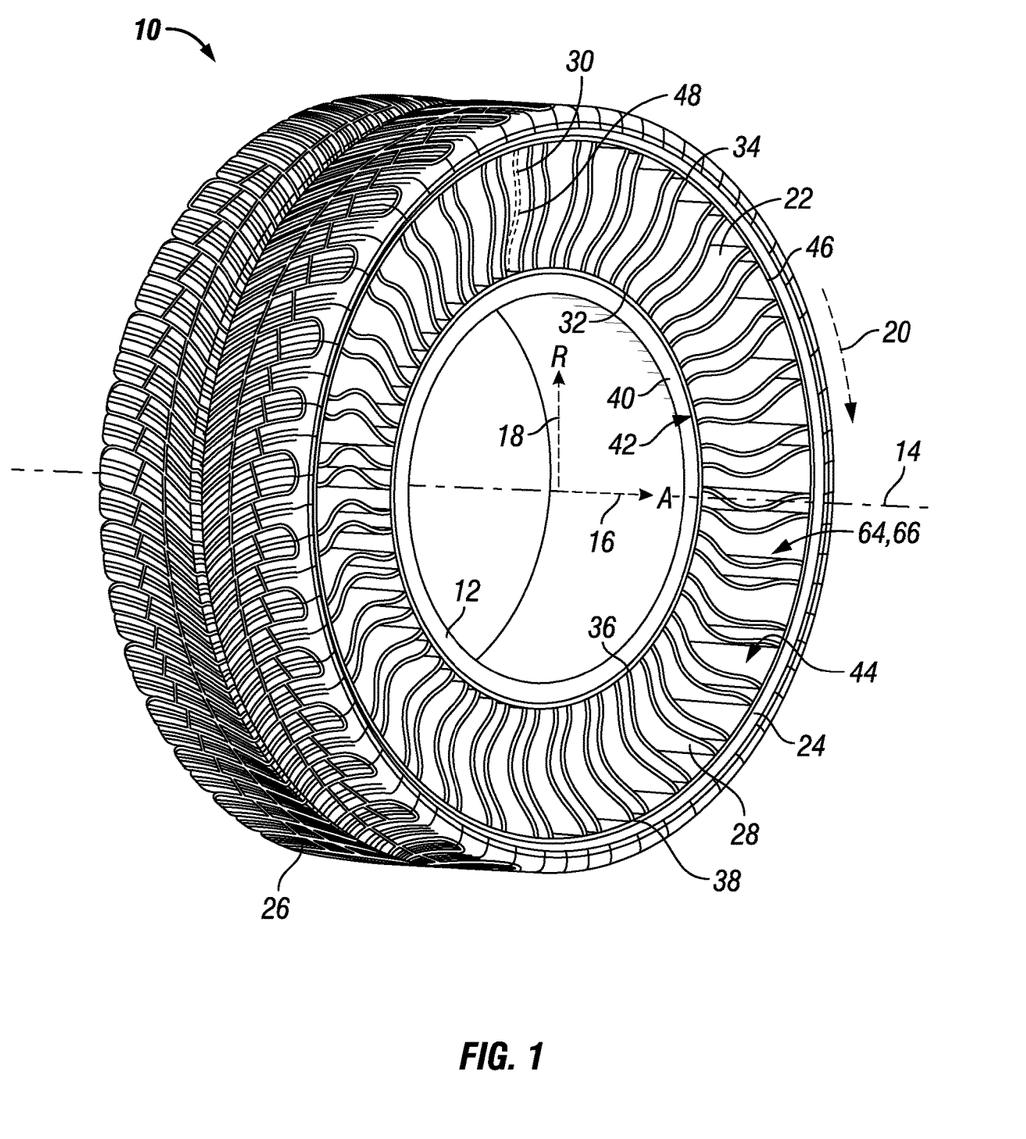
FIG. 1 is a perspective view of a tire with a static discharge element in accordance with one exemplary embodiment.

With reference to FIG. 1, a non-pneumatic tire 10 is shown that has an axis of rotation about the central axis 14. The central axis 14 extends in an axial direction 16 of the tire 10. The central axis 14 extends through an opening of a hub 12 of the tire 10. The radial direction of the tire 10 is oriented at a perpendicular angle to the central axis 14 such that the hub 12 is spaced radially inwards from other portions of the tire 10 such as the supporting structure 22 and the tread 16. The non-pneumatic tire 10 also has a circumferential direction 20 about which various portions of the tire 10 extend. For example, the tread 26, shear band 24, supporting structure 22, and hub 12 all extend 360 degrees in the circumferential direction 20 about the central axis 14.

Figure 2:
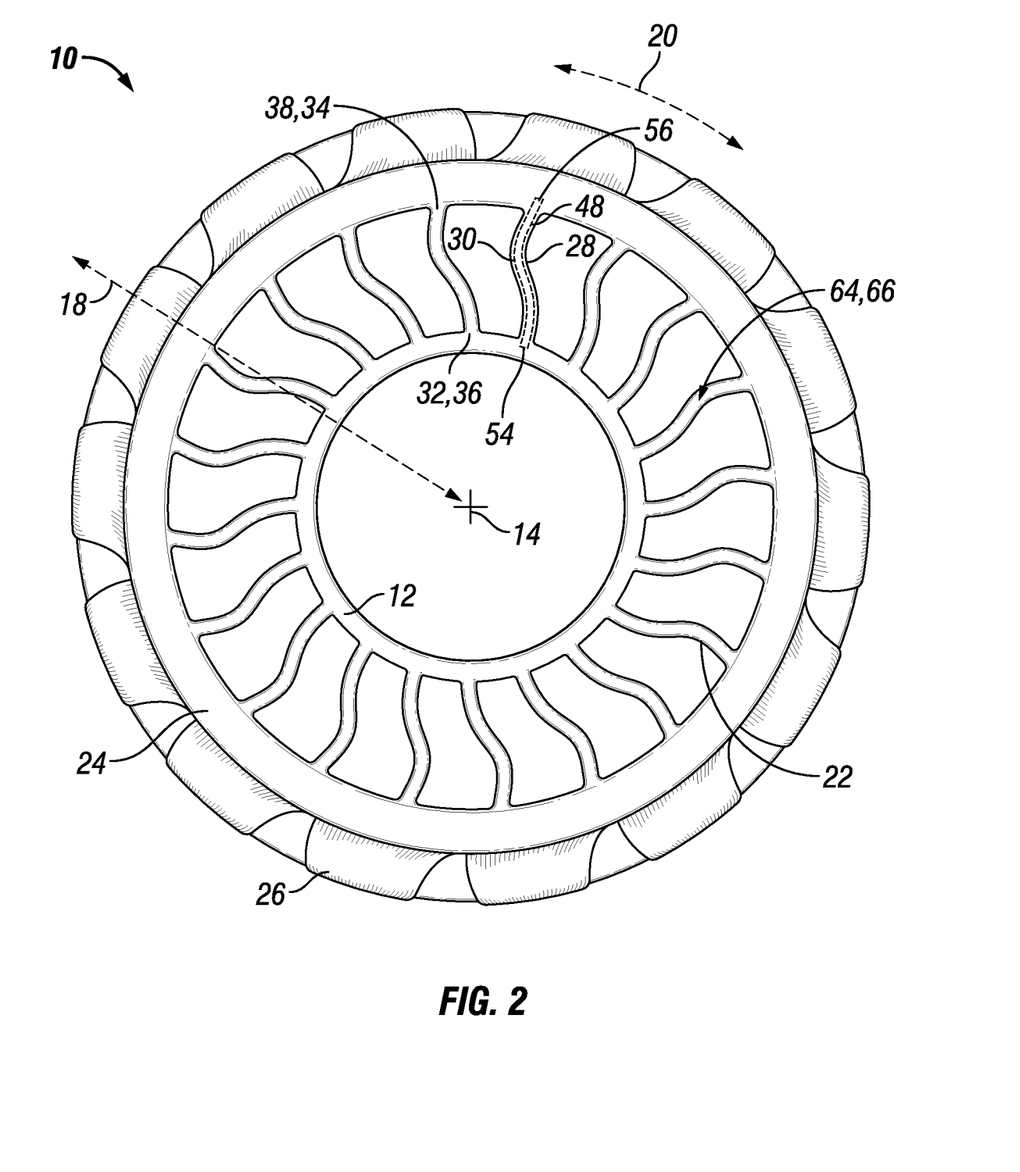
FIG. 2 is a side view of a tire with the static discharge element of FIG. 1 included therein.

FIG. 2 illustrates a non-pneumatic tire 10 that is arranged in a different manner than the non-pneumatic tire 10 of FIG. 1. The supporting structure 22 engages the hub 12 and is located outward from the hub 12 in the radial direction 18. The supporting structure 22 is made of a series of spokes 28 that extend from the hub 12 to a shear band 24 in the radial direction 18. It is to be understood that in other arrangements that the supporting structure 22 need not include spokes 28. For example, the supporting structure 22 could be made of a series of elements arranged into a honeycomb like structure that extends 360 degrees about the central axis 14. In yet other arrangements, the supporting structure 22 may be a solid member that extends 360 degrees about the central axis 14 in the circumferential direction 20.

The supporting structure 22 has a first radial end 32 that is at the hub 12 and that coincides with a first radial terminal end 36 of the spoke 28. The spoke 28 extends in the radial direction 18 to the shear band 24 in which a second radial end 34 of the supporting structure 22 is located. As the spoke 28 terminates at the shear band 24, the second radial terminal end 38 of the spoke 28 is likewise located at the second radial end 34. The shear band 24 is outward from the various spokes 28 in the radial direction 18 and extends 360 degrees about the central axis 14 in the circumferential direction 20. The tread 26 of the non-pneumatic tire 10 is outward from the shear band 24 in the radial direction 18 and likewise extends completely around the central axis 14 in the circumferential direction 20.

The static discharge element 30 is located inside of the spoke 28 and extends from the hub 12 through the spoke 28 to the shear band 24. The static discharge element 30 may also be located inside of the hub 12 and/or the shear band 24. In other embodiments, the static discharge element simply engages the hub 12 and shear band 24 and is not inside of these elements. Electricity may thus be transferred from the hub 12 to the shear band 24 through the spokes 28 via the static discharge element 30. In the embodiments in which engagement occurs, the static discharge element 30 is located at or between the first and second radial terminal ends 36 and 38, and does not extend outward past the second radial terminal end 38, and does not extend inward past the first radial terminal end 36.

Figure 3:
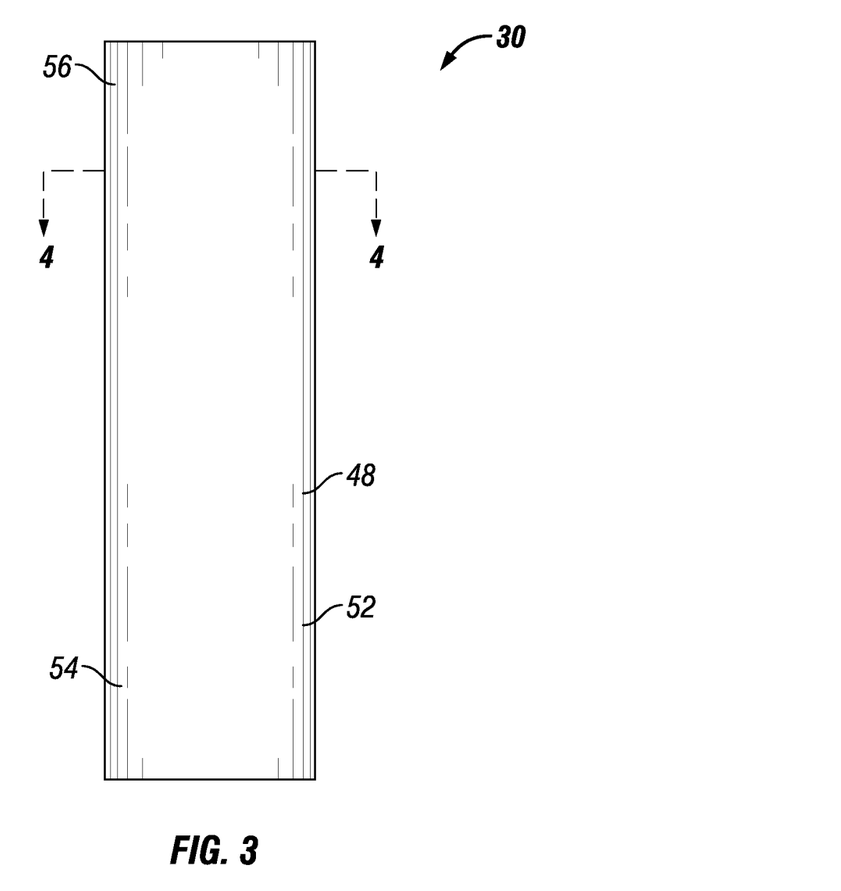
FIG. 3 is a front view of the static discharge element of FIG. 1 that is a filament.
Figure 4:
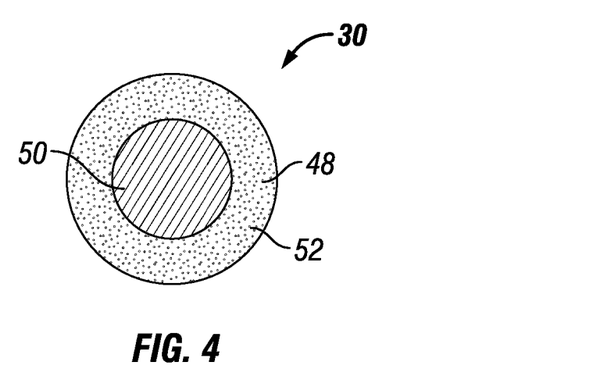
FIG. 4 is a cross-sectional view taken along line 4-4 of FIG. 3.

The static discharge element 30 in one embodiment is illustrated in FIGS. 3 and 4 and may be a filament 48 that is a slender, thread like object. The filament 48 may have a circular cross-sectional shape, but other shapes are possible. The filament 48 may have a polymeric strand 50 and conductive carbon 52. The conductive carbon 52 may coat the length of the polymeric strand 50 so as to cover the entire length of the polymeric strand 50. In some instances, the conductive carbon 52 may also coat the terminal top end and terminal bottom end of the polymeric strand 50 so that the polymeric strand 50 is completely covered on all sides by the conductive carbon 52. In some arrangements, the polymeric strand 50 is suffused with the conductive carbon 52. The polymeric strand 50 has a circular cross-sectional shape, and the conductive carbon 52 has a circular cross-sectional shape with an inner void of circular cross-sectional shape filled with the polymeric strand 50. The filament 48 may include any type of conductive particles to enable electrical conductivity. In some instances, the conductive particles may be powdered copper. The electrically conductive particles can be infused within other portions of the filament 48.

The polymeric strand 50 may be a synthetic polymer such as synthetic rubber, phenol formaldehyde resin, neoprene, nylon, polyvinyl chloride polystyrene, polyethylene, polypropylene, polyacrylonitrile, silicone, polyethylene terephthalate (PET), aramid, and hybrids of these as well. The polymeric strand 50 may also be a natural polymeric material such as natural rubber. The filament 48 may be configured as a monofilament, a multifilament yarn, a tow, or a staple.

The spoke 28 must flex during rotation of the tire 10, and the spoke 28 may have an elongation of 10%, although in other instances the elongation of the spoke 28 may be from 0%-4%, from 4%-5%, from 5%-15%, from 8%-12%, from 9%-11%, from 10%-13%, from 10%-15%, from 15%-25%, up to 30%, or up to 50%. The filament 48 may have an elongation that is at least 10% so that the filament 48 is likewise capable of stretching to accommodate stretching of the spoke 28 into which it is carried. In other embodiments, the filament 48 may have an elongation of from 0%-5%, from 5%-10%, from 10%-15%, from 15%-20%, from 20%-25%, from 25%-30%, from 30%-35%, from 35%-40%, from 40%-45%, from 45%-50%, from 50%-55%, from 55%-60%, or up to 60%, at least 2%, at least 4%, at least 5%, at least 8%, at least 10%, at least 15%, at least 20%, at least 25%, at least 30%, at least 35%, at least 40%, at least 45%, or at least 50%. The elongation numbers described may be the elongation of the component at break. In one exemplary embodiment, the elongation at break of the filament 48 is 41%. The spoke 28 may be designed so that carbon black is not present in areas of the spoke other than the filament 48.

The electrical conductivity of the static discharge element 30 may be greater than that of the spoke 28 so that electricity more easily flows through the static discharge element 30 than the spoke 28. The spoke 28 may be made of polyurethane and thus may not have good electrical conductivity. The average electrical resistivity of the static discharge element 30 may be $4 \times 10^5$ ohms/centimeter. In other arrangements, the average electrical resistivity of the static discharge element 30 may be from $1 \times 10^5 - 4 \times 10^5$ ohms/ centimeter, from $4 \times 10^5$-$1 \times 10^6$ ohms/centimeter, from $1 \times 10^6$-$5 \times 10^6$ ohms/centimeter, or up to $1 \times 10^7$ ohms/centimeter.

The filament 48 may be RESISTAT® F902 Merge R022, which is manufactured by Jarden Applied Materials having offices located at 1451 Sand Hill Road, Enka, N.C., 28728, USA. This filament 48 is a 22-denier nylon 6 monofilament 50 which has electrically conductive carbon 52 suffused onto the surface of the monofilament 50. The filament 48 has a round cross-section and the conductive carbon 52 has a thickness of 1 micron on the monofilament 50. The tenacity of this filament 48 is 5 grams/denier, the elongation at break is 41%, and the average electrical resistivity is $4 \times 10^5$ ohms/centimeter. The suffusion process chemically saturates the outer skin of the nylon monofilament 50 with the electrically conductive carbon particles 52. The conductive carbon 52 becomes part of the structure of the nylon monofilament 50 which retains the strength and flexibility of the nylon monofilament 50. The suffusion process results in a filament 48 with a durable, conductive sheath that does not crack or lose conductivity during flexing.

Although described as having conductive carbon 52 in the filament 48, other types of electrically conductive carbon may be included such as carbon nanotube (CNT), graphite, grapheme, or carbon black. Further, although described as having electrically conductive carbon in the filament, other types of metallic fillers could be used for the purpose of conducting electricity through the filament 48.

Figure 5:
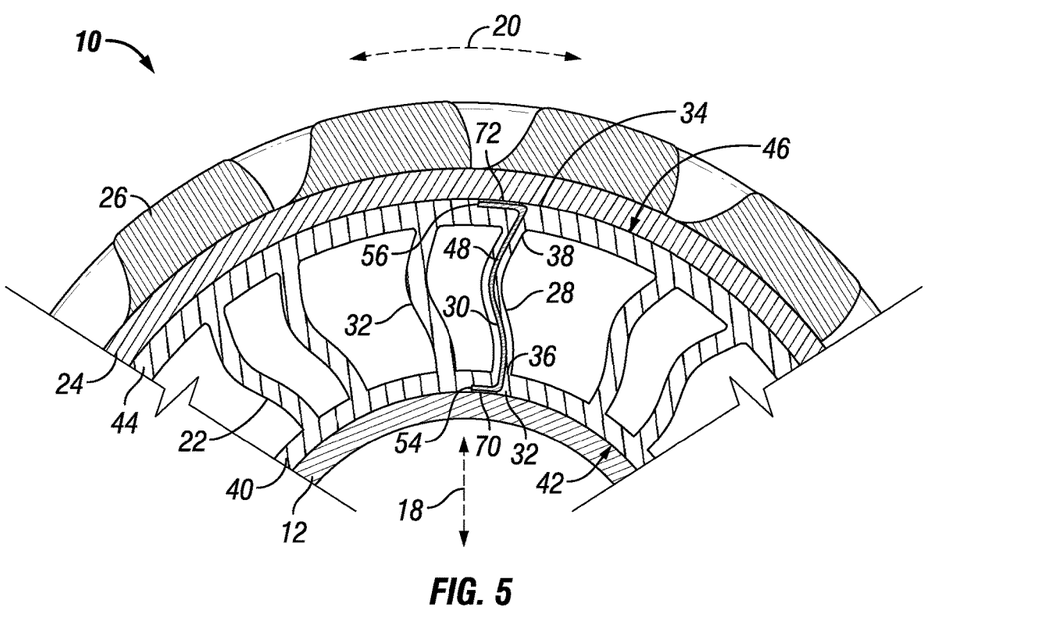
FIG. 5 is a cross-sectional view of a portion of a non-pneumatic tire with a static discharge element that is a filament.

FIG. 5 is a cross-sectional view of a portion of the non-pneumatic tire 10 that includes a static discharge element 30 that is the filament 48. The portion of the non-pneumatic tire 10 illustrated in FIG. 5 is an arc-length portion of the tire 20 in the circumferential direction. The supporting structure 22 includes an inner interface ring 40 and an outer interface ring 44 disposed outwardly from the inner interface ring in the radial direction 18. The supporting structure 22 also includes a plurality of spokes 28 that engage both the inner and outer interface rings 40, 44. The first radial end 32 of the supporting structure 22 is at the inner interface ring 40, and the second radial end 34 of the supporting structure 22 is at the outer interface ring 44. The first radial terminal end 36 of the spoke 28 is at the inner interface ring 40, and the second radial terminal end 38 of the spoke 28 is at the outer interface ring 44.

The filament 48 extends through the interior of the spoke 28, and also extends through the inner interface ring 40 and the outer interface ring 44. A first end 54 of the filament 48 extends some distance in the circumferential direction 20 along a first terminal end 42 of the inner interface ring 40. The first end 54 is located between the first terminal end 42 and the hub 12. Adhesive 70 may be applied to the first end 54 and the hub 12 to attach these two elements. The adhesive 70 may be electrically conductive in order to allow electricity to flow from the hub 12 into the first end 54 of the static discharge element 30. The adhesive 70 may have a concentration of carbon black of 23% weight, or may have a concentration of graphene of 2% weight. Although described as being connected through the use of adhesive 70, any other form of attachment of the first end 54 can be implemented. A mechanical connection can be used to attach the first end 54 of the filament 48 to the hub 12 or to the inner interface ring 40. The mechanical connection can be electrically conductive as well in order to allow electricity to flow through the hub 12 to the first end 54. The connection need not be electrically conductive if the first end 54 is placed against the hub 12 to cause electrical connectivity between the first end 54 and the hub 12.

The second end 56 extends along a length of a second terminal end 46 of the outer interface ring 44 in the circumferential direction 20. The second end 56 is located between the second terminal end 46 and the shear band 24. Adhesive 72, that can be electrically conductive as described above with respect to adhesive 70, is used to attach the second end 56 to the shear band 24. As with the first end 54, other types of connection, such as a mechanical connection, can be used to attach the second end 56 to the shear band 24. Electricity from the filament 48 may flow through the second end 56 and the electrically conductive adhesive 72 into the shear band 24 for subsequent discharge from the non-pneumatic tire 10. The adhesive 70 and 72 need not be used in other embodiments, and the ends 54 and 56 can be placed into engagement with the hub 12 and shear band 24 by other means. Further, although described as going through the interiors of the outer interface ring 44, spoke 28, and inner interface ring 40, the filament 48 may be on the outside of one or more of these components in other configurations of the non-pneumatic tire 10.

Figure 6:
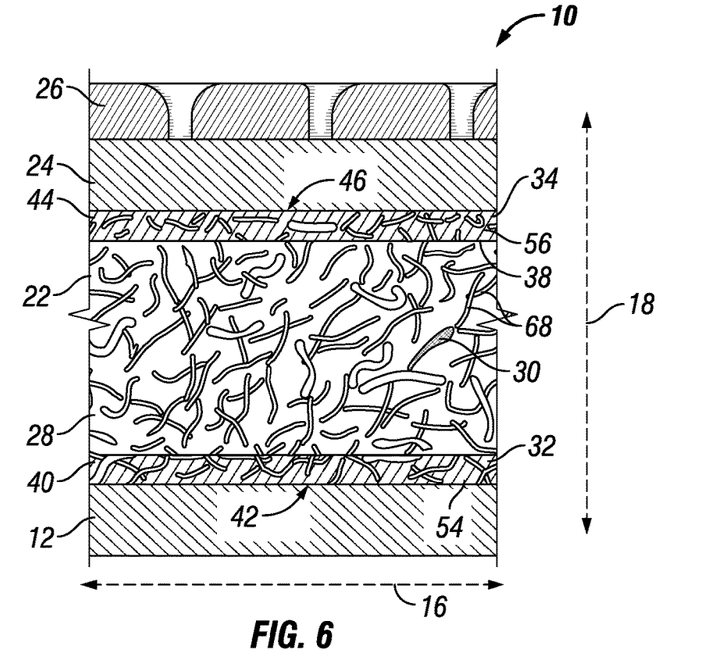
FIG. 6 is a cross-sectional view of a portion of a non-pneumatic tire in which the static discharge element is made of filament fibers.

An alternative arrangement of the non-pneumatic tire 10 is shown in FIG. 6 which is a cross-sectional view of a non-pneumatic tire 10 taken between a pair of spokes 28 in the circumferential direction 10 as the spoke 28 viewed is not in cross-section. The static discharge element 30 is filament fiber 68 filler that is included into the other material of the supporting structure 22. The supporting structure 22 shown has an inner interface ring 40, an outer interface ring 44, and a plurality of spokes 28. These components 28, 40, and 44 may be made of polyurethane, and filler made up of the filament fibers 68 may be included in this polyurethane. The filament fibers 68 can be mixed into the polyurethane and distributed about the components 28, 40 and 44 as shown in FIG. 6. In other embodiments, the components 28, 40 and 44 and any other portions of the supporting structure 22 can be made of reinforced and non-reinforced material such as a polymeric material. The polymeric material may be polyurethane, copolyester, polyether block amide and polyolefins. Still further, other embodiments of the non-pneumatic tire 10 as described herein can include components such as the spoke 28, inner interface ring 40, outer interface ring 44, and supporting structure 22 that includes the different types of polymeric materials. Other types of materials may be included in the components such as polyurethane, copolyester, polyether block amide and polyolefins.

The filament fibers 68 may be from 2-7 millimeters in length and may have characteristics similar to filament 48 previously discussed in that they may be electrically conductive and can have the degrees of elasticity identified. The resulting spoke 28 may be capable of flexing the required amount and electricity may be conducted through the spoke 28 as the overlapping filament fibers 68 form a pathway through which electricity can be conducted through the components 40, 28, and 44. The filament fibers 68 may be placed into the supporting structure 22 throughout the entire supporting structure 22 so that the filament fibers 68 are found 360 degrees around the supporting structure 22 in the circumferential direction 20. Alternatively, the filament fibers 68 may be placed into only a section of the supporting structure 22 so that they are found along only an arc length of the supporting structure 22 in the circumferential direction 20 and not 360 degrees around the central axis 14.

Figure 7:
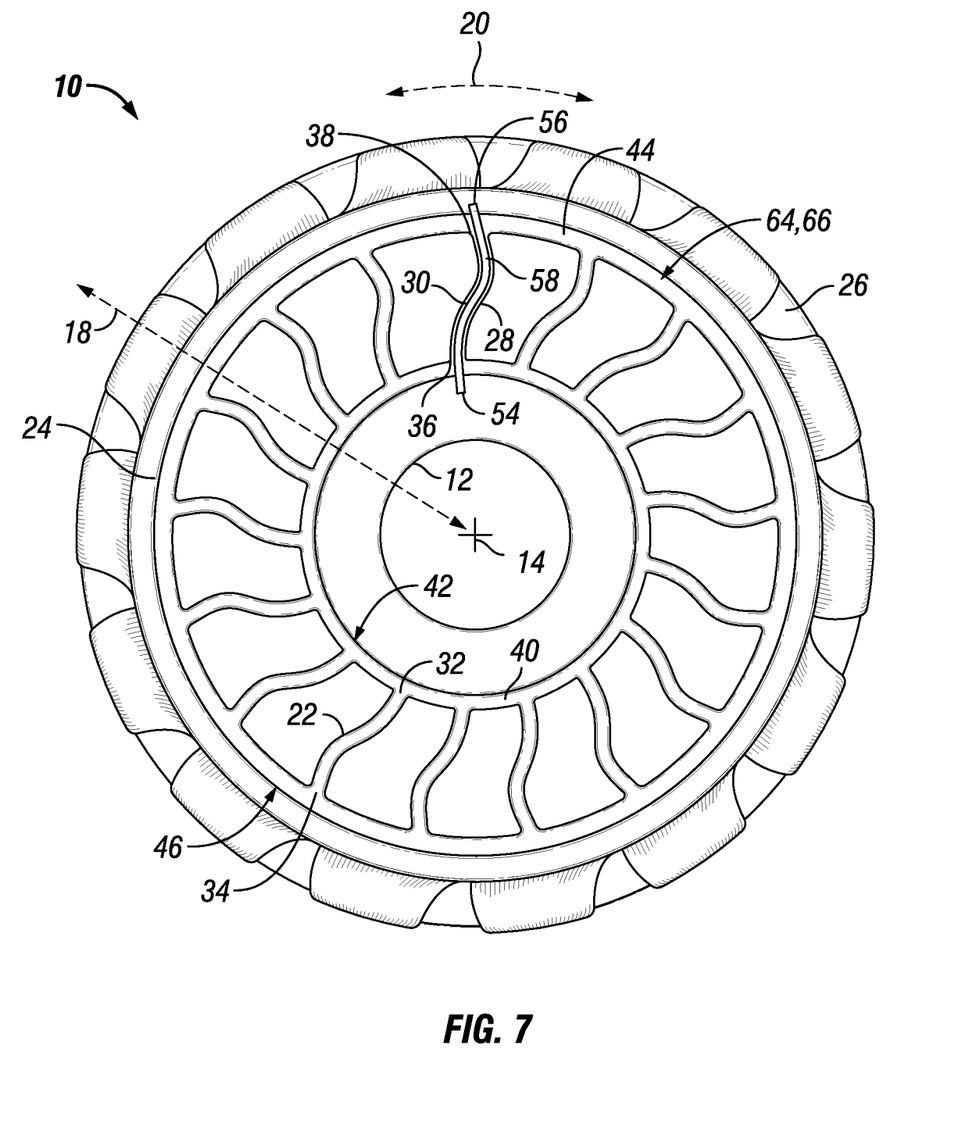
FIG. 7 is a side view of a non-pneumatic tire with a static discharge element that is elastic electrically conductive tape.

An alternative arrangement of the non-pneumatic tire 10 is shown in FIG. 7 and is configured in a manner similar to the one described with respect to FIG. 5. The supporting structure 22 includes an inner interface ring 40, a plurality of spokes 28, and an outer interface ring 44. The static discharge element 30 is an elastic electrically conductive tape 58 through which electricity may be conducted. The elastic electrically conductive tape 58 is located on an axial face 64 of the supporting structure 22. The axial face 64 is at a terminal axial end 66 of the supporting structure 22 in the axial direction 16. As such, the elastic electrically conductive tape 58 is not located in the interior of the supporting structure 22, but rather is located on the outside of the supporting structure 22. The elastic electrically conductive tape 58 engages the hub 12 and extends across the inner interface ring 40, the spoke 28, and the outer interface ring 44. The elastic electrically conductive tape 58 also engages the shear band 24 so that it is on the side faces of the shear band 24 and the hub 12 in the axial direction 16. Electricity from the hub 12 is conducted through the elastic electrically conductive tape 58 and into the shear band 24. The spoke 28 may be conducted so that carbon black is not present in the portions of the spoke 28 outside of the elastic electrically conductive tape 58, and in some instances may not be present at all in the spoke 28 and the elastic electrically conductive tape 58.

The elastic electrically conductive tape 58 extends in the radial direction 18 and also changes course in the circumferential direction 20 upon its extension outward in the radial direction 18. The elastic electrically conductive tape 58 could be applied to a mold surface before molding so that it is captured by the supporting structure 22 material. However, in other arrangements the elastic electrically conductive tape 58 could be applied by adhesives or other means after formation of the supporting structure 22 and other elements of the non-pneumatic tire 10. The elastic electrically conductive tape 58 can stretch in one or more directions in order to accommodate deformation of the spoke 28 during normal use of the non-pneumatic tire 10.

Figure 8:
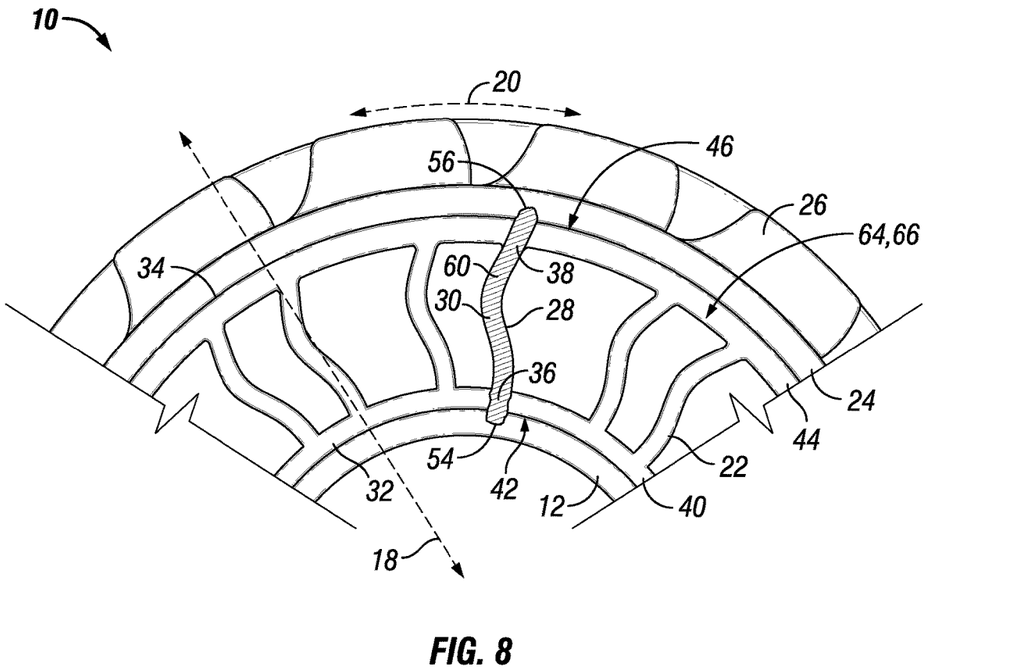
FIG. 8 is a side view of a portion of a non-pneumatic tire with a static discharge element that is electrically conductive paint.

FIG. 8 shows an arc length portion of the non-pneumatic tire 10 in the circumferential direction 20. The supporting structure 22 again has the inner interface ring 40, the spoke 28, and the outer interface ring 44. The static discharge element 30 is electrically conductive paint 60 that is located on the axial face 64 of the supporting structure 22 that is the terminal axial end 66 of the supporting structure 22. The electrically conductive paint 60 is located on an axial face of the hub 12 and on an axial face of the shear band 24. The electrically conductive paint 60 is thus not found on the interior of the supporting structure 22, but is on an exterior surface of the supporting structure 22. The electrically conductive paint 60 can be applied directly to the spoke 28, inner interface ring 40, and outer interface ring 44 after molding of these components. The electrically conductive paint 60 may also be applied to the shear band 24 and the hub 12 after they have been molded or otherwise formed. The electrically conductive paint 60 could alternatively be applied to a mold surface and then released during molding of the supporting structure 22. The electrically conductive paint 60 may be applied to an injection molded supporting structure 22 that does not have a release agent. The electrically conductive paint 60 can cover the entire terminal axial end 66 of the spoke 28, but not the entire terminal axial ends 66 of the inner and outer interface rings 40, 44 but only a portion of their terminal axial ends 66. The spoke 28 may be arranged so that carbon black is not present in portions of the spoke 28 outside of the electrically conductive paint 60, and the spoke may also be arranged so carbon black is not present at all either in the electrically conductive paint 60 or the portions of the spoke 28 outside of the electrically conductive paint 60.

Figure 9:
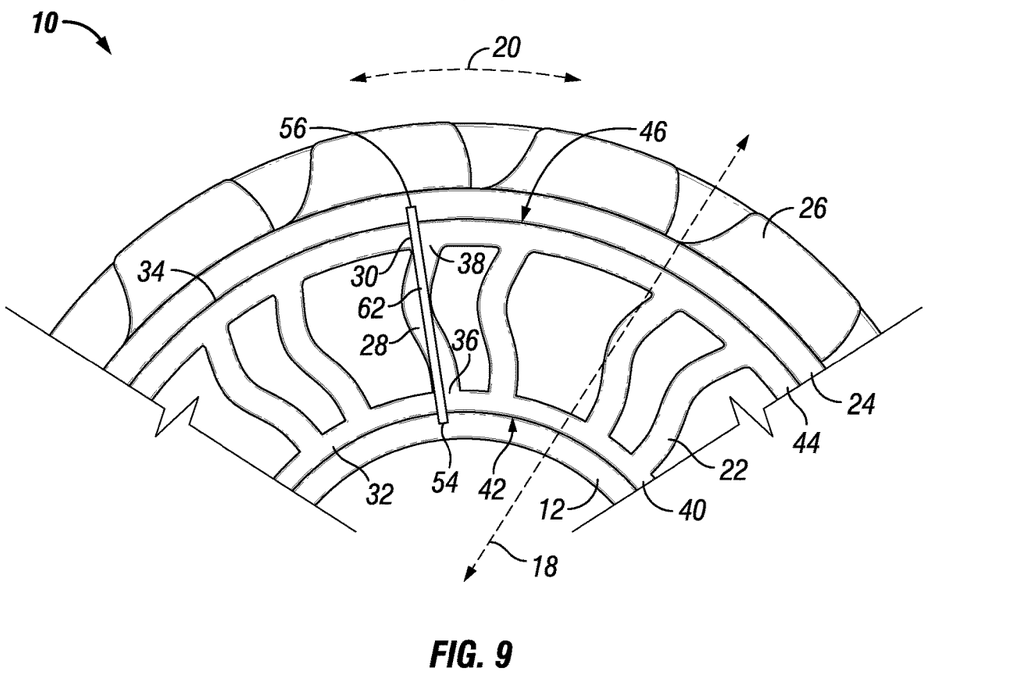
FIG. 9 is a side view of a portion of a non-pneumatic tire with a static discharge element that is a strip of electrically conductive polymer.

An alternative arrangement of the non-pneumatic tire 10 is shown in FIG. 9 that includes a supporting structure 22 that again has spokes 28, inner interface ring 40, and outer interface ring 44. The static discharge element 30 is a strip of electrically conductive polymer 62. The supporting structure 22 and electrically conductive polymer 62 are formed by a two shot injection molding process. A first shot applies the strip of electrically conductive polymer 62 onto the mold surface between the hub 12 and the shear band 24. A second shot completes the mold assembly by injecting the inner interface ring 40, spokes 28, and outer interface ring 44. The electrically conductive polymer 62 is captured by the spoke 28. The electrically conductive polymer 62 may abut the first terminal end 42 and the second terminal end 46 to put the electrically conductive polymer 62 into electrical communication with the hub 12 and the shear band 24. In the arrangement in FIG. 9, the end 54 of the electrically conductive polymer 62 overlays the exterior surface of the hub 12, and the end 56 overlays the side of the shear band 24 to allow electricity to transfer into the shear band 24. The electrically conductive polymer 62 may extend in a generally straight orientation in the radial direction 18 as shown, but it is to be understood that the electrically conductive polymer 62 may flex some degree in the circumferential direction 20 during normal flexing of the spoke 28 during use. The spoke 28 may be provided so that carbon black is not present in portions of the spoke outside of the electrically conductive polymer 62, and may alternatively be arranged so that carbon black is not present at all in the electrically conductive polymer 62 or in the portions of the spoke 28 other than the electrically conductive polymer 62.

Although the various embodiments have been described as lacking carbon black in the portions of the spoke 28 outside of the static discharge element 30, it is to be understood that carbon black could in fact be present in the portions of the spoke 28 that are not the static discharge element 30 in other versions of the non-pneumatic tire 10. Embodiments discussed also show a single static discharge element 30 incorporated into the non-pneumatic tire 10. It is to be understood that additional embodiments are possible in which multiple static discharge elements 30 are present on the non-pneumatic tire 10. For example, from 2-4, from 5-7, or up to 10 static discharge elements 30 may be present. One of, or multiple spokes 28 could have the various static discharge elements 30, and in some instances all of the spokes 28 of the tire 10 can have a static discharge element 30. Also, although some of the previously discussed embodiments have the static discharge element 30 located on a single axial face 64 of the supporting structure 22, other embodiments are possible in which the opposite axial face of the supporting structure 22 likewise includes one or more of the static discharge elements 30. Still further, it is to be understood that when more than one static discharge element 30 is present in the tire 10 they may all be of the same type or may be of different types. For example, the non-pneumatic tire 10 could include both a filament 48 and filament fibers 68 in some embodiments. In other embodiments, the non-pneumatic tire 10 may have static discharge elements 30 that are filaments 48, elastic electrically conductive tape 58, and electrically conductive paint 60.

The spokes 28 and the variously discussed static discharge elements 30 may be capable of stretching. The static discharge element 30 may be able to elongate 10%, and in other instances the elongation of the static discharge element 30 may be from 5%-15%, from 8%-12%, from 9%-11%, from 10%-13%, from 10%-15%, from 15%-25%, up to 30%, up to 40%, or up to 50%. The spokes 28 may be able to elongate the same amount as the static discharge elements 30 so that, for instance, both the spoke 28 and the static discharge element 30 carried by the spoke 28 can withstand an elongation during operation of up to 10%. The static discharge element 30 may be able to elongate a greater degree than the other portions of the supporting structure 22, such as portions of the spoke 28 that are not the static discharge element 30 in those instances in which the supporting structure 22 does in fact include a spoke 28.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A non-pneumatic tire, comprising:
   a hub that has a central axis;
   a supporting structure located outward from the hub in a radial direction, wherein the supporting structure has a spoke that is one of a plurality of spokes;
   a shear band located outward from the supporting structure in the radial direction;
   tread located outward from the shear band in the radial direction; and
   a static discharge element that extends from a first radial end of the supporting structure to a second radial end of the supporting structure, wherein the first radial end is located closer to the central axis than the second radial end in the radial direction, wherein the static discharge element is electrically conductive, wherein the static discharge element is carried by the spoke of the supporting structure such that the static discharge element is inside the spoke and opposite sides of the static discharge element in a circumferential direction of the tire both engage the spoke, wherein the static discharge element is free from engagement with successive ones of the plurality of spokes,
   wherein a portion of the spoke has less electrical conductivity than the static discharge element and forms a side face of the spoke that is a forward terminal side of the spoke in the circumferential direction, and wherein the forward terminal side of the spoke is free from engagement with the static discharge element.

2. The non-pneumatic tire as set forth in claim 1, wherein:
   the first radial end is a first terminal end of the supporting structure;
   wherein the second radial end is a second terminal end of the supporting structure; and
   wherein the spoke has a first radial terminal end that is located at the first radial end of the supporting structure, wherein the spoke has a second radial terminal end that is located at the second radial end of the supporting structure.

3. The non-pneumatic tire as set forth in claim 1, wherein:
   the supporting structure has an inner interface ring, wherein the first radial end has a first terminal end of the inner interface ring that engages the hub;
   wherein the supporting structure has an outer interface ring, wherein the second radial end has a second terminal end of the outer interface ring that engages the shear band; and
   wherein the spoke extends from the inner interface ring to the outer interface ring in the radial direction.

4. The non-pneumatic tire as set forth in claim 3, wherein the static discharge element is a filament and is located inside of the spoke, wherein the static discharge element has a first end that engages the inner interface ring and the hub and extends in a circumferential direction, wherein the static discharge element has a second end that engages the outer interface ring and the shear band and extends in the circumferential direction.

5. The non-pneumatic tire as set forth in claim 1, wherein the static discharge element is an elastic electrically conductive tape.

6. The non-pneumatic tire as set forth in claim 1, wherein the static discharge element is an electrically conductive paint.

7. The non-pneumatic tire as set forth in claim 1, wherein the static discharge element is a strip of electrically conductive polymer.

8. The non-pneumatic tire as set forth in claim 7, wherein the supporting structure and the static discharge element are formed by a two shot injection molding process wherein a first shot or a second shot applies the strip of electrically conductive polymer to a mold surface between the hub and the shear band, and wherein the other one of the first shot or the second shot applies the supporting structure.

9. The non-pneumatic tire as set forth in claim 8, wherein the supporting structure has an axial face that is located at a terminal axial end of the supporting structure in an axial direction, wherein the static discharge element is located at the axial face.

10. The non-pneumatic tire as set forth in claim 9, wherein:
    the supporting structure has an inner interface ring and an outer interface ring;
    wherein the axial face is located at the inner interface ring, the outer interface ring, and the spoke;
    and wherein the static discharge element engages the hub and the shear band.

11. The non-pneumatic tire as set forth in claim 1, wherein the supporting structure includes a polymeric material that is selected from the group consisting of polyurethane, copolyester, polyether block amide and polyolefins;
    wherein the static discharge element is a plurality of filament fibers that are filler of the polymeric material of the supporting structure, wherein the filament fibers are electrically conductive.

12. A non-pneumatic tire, comprising:
    a hub that has a central axis;
    a supporting structure located outward from the hub in a radial direction, wherein the supporting structure has a spoke that is one of a plurality of spokes;
    a shear band located outward from the supporting structure in the radial direction;
    tread located outward from the shear band in the radial direction; and
    a static discharge element that extends from a first radial end of the supporting structure to a second radial end of the supporting structure, wherein the first radial end is located closer to the central axis than the second radial end in the radial direction, wherein the static discharge element is electrically conductive, wherein the static discharge element is carried by the spoke of the supporting structure;
    wherein the spoke has an axial face located at an axial end of the spoke in an axial direction, wherein the static discharge element engages the axial face of the spoke and is located at a terminal end of the tire in the axial direction, wherein the static discharge element is free from engagement with successive ones of the plurality of spokes, wherein a portion of the spoke has less electrical conductivity than the static discharge element and forms a side face of the spoke that is a forward terminal side of the spoke in the circumferential direction, and wherein the forward terminal side of the spoke is free from engagement with the static discharge element.

* * * * *